(12) United States Patent
Rui et al.

(10) Patent No.: US 9,113,436 B2
(45) Date of Patent: Aug. 18, 2015

(54) METHOD AND SYSTEM FOR INFORMATION TRANSMISSION

(75) Inventors: Tong Rui, Shenzhen (CN); Mo Sun, Shenzhen (CN); Xiaoyun Zhou, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 178 days.

(21) Appl. No.: 13/643,300

(22) PCT Filed: Jun. 15, 2011

(86) PCT No.: PCT/CN2011/075767
§ 371 (c)(1),
(2), (4) Date: Oct. 25, 2012

(87) PCT Pub. No.: WO2012/003760
PCT Pub. Date: Jan. 12, 2012

(65) Prior Publication Data
US 2013/0094487 A1 Apr. 18, 2013

(30) Foreign Application Priority Data

Jul. 7, 2010 (CN) .......................... 2010 1 0223783

(51) Int. Cl.
| | |
|---|---|
| H04W 4/00 | (2009.01) |
| H04W 68/00 | (2009.01) |
| H04W 76/02 | (2009.01) |
| H04W 12/06 | (2009.01) |
| H04M 15/00 | (2006.01) |
| H04W 12/08 | (2009.01) |
| H04L 29/06 | (2006.01) |
| H04L 12/14 | (2006.01) |

(52) U.S. Cl.
CPC ............ *H04W 68/005* (2013.01); *H04L 65/80* (2013.01); *H04M 15/66* (2013.01); *H04M 15/8033* (2013.01); *H04W 12/06* (2013.01); *H04W 12/08* (2013.01); *H04W 76/022* (2013.01); *H04L 12/14* (2013.01); *H04M 2215/204* (2013.01)

(58) Field of Classification Search
None
See application file for complete search history.

(56) References Cited

U.S. PATENT DOCUMENTS

2008/0310358 A1* 12/2008 Shaheen ........................ 370/329
2008/0316971 A1* 12/2008 Shaheen ........................ 370/331

(Continued)

FOREIGN PATENT DOCUMENTS

| CN | 101217810 A | 7/2008 |
| WO | 2010020637 A1 | 2/2010 |

OTHER PUBLICATIONS

Author Unknown, 3GPP TS 23.303 v8.9.0, Mar. 26, 2010, pp. 1-116.*

(Continued)

*Primary Examiner* — Christopher Crutchfield
(74) *Attorney, Agent, or Firm* — Ling Wu; Stephen Yang; Ling and Yang Itellectual Property

(57) ABSTRACT

The present invention discloses a method and system for information transmission. Said method includes: an Evolved Packet Data Gateway (ePDG) notifying a Policy and Charging Rules Function (PCRF) entity of the location information of a User Equipment (UE); the PCRF entity sending the location information of the UE to a Broadband Policy Control Function (BPCF) entity. The method and system provided by the present invention solve the problem that the BPCF in a fixed network can not initiate an S9* session to the PCRF entity.

15 Claims, 5 Drawing Sheets

(56) References Cited

U.S. PATENT DOCUMENTS

2008/0316972 A1* 12/2008 Shaheen .................. 370/331
2009/0097477 A1*  4/2009 Zhu ........................ 370/352
2009/0300307 A1* 12/2009 Carbone et al. ............ 711/163
2012/0265888 A1* 10/2012 Roeland et al. ............ 709/228

OTHER PUBLICATIONS

Author Unknown, Thompson, Triple-Play Using IPoE for Voice, PPPoE for Data and Bridged Video on Multiple PVCs (without VLANs, Apr. 2008, pages.*

TD S2-103412, 3GPP TSG SA WG2 Meeting #80, Aug. 30-Sep. 3, 2010, Brunstad (Norway), see pp. 2-3.

International Search Report for PCT/CN2011/075767 dated Aug. 31, 2011.

"3rd Generation Partnership Project"; Technical Specification Group Services and System Aspects; Study on Support of BBF Access Interworking (Release 10); 3GPP TR 23.839 V0.1.1 (May 2010); XP 50441489A.

* cited by examiner

METHOD AND SYSTEM FOR INFORMATION TRANSMISSION

TECHNICAL FIELD

The present invention relates to the field of mobile communications, and more especially, to a method and system for information transmission.

BACKGROUND OF THE RELATED ART

The $3^{rd}$ Generation Partnership Project (referred to as 3GPP) Evolved Packet System (referred to as EPS) consists of the Evolved Universal Terrestrial Radio Access Network (referred to as E-UTRAN), the Mobility Management Entity (referred to as MME), the Serving gateway (S-GW), the Packet Data Network Gateway (referred to as P-GW or PDN GW), the Home Subscriber Server (referred to as HSS), the 3GPP authentication, authorization and accounting (referred to as AAA) server, the Policy and Charging rules Function (referred to as PCRF) entity and other support nodes. FIG. 1 is a schematic diagram of the EPS system architecture in the related art, as shown in FIG. 1, the mobility management entity is responsible for control plane related work such as managing the mobility, processing the non-access layer signaling and managing the user mobility management context; the S-GW is an access gateway equipment connecting with the E-UTRAN and forwarding data between the E-UTRAN and the P-GW, and is responsible for caching paging await data; the P-GW is a border gateway of the EPS and the packet data network (PDN) and is responsible for the PDN access and forwarding data between the EPS and the PDN, and other functions; the S-GW and the P-GW belong to the core network gateway; the PCRF entity is a policy and charging Rules Function entity, it connects with an operator Internet protocol (referred to as IP) service network through the receiver interface Rx to access the service information, in addition, it is connected with a gateway device in the network through the Gx/Gxa/Gxc interface and is responsible for initiating the establishment of the IP bearer, thus guaranteeing the Quality of Service (referred to as QoS) of the service data and controlling the charging.

The EPS supports to inter-connect with the non-3GPP system, wherein, the interconnection with the non-3GPP system is implemented through the S2a/b/c interface, the P-GW works as an anchor point between the 3GPP and non-3GPP systems. In the system architecture diagram of the EPS, the non-3GPP IP system is divided into trusty non-3GPP IP access and untrusty non-3GPP IP access. The trusty non-3GPP IP access can be directly connected to the P-GW through the S2a interface; the untrusty non-3GPP IP access needs to be connected to the P-GW through the Evolved Packet Data Gateway (referred to as ePDG), and the interface between the ePDG and the P-GW is the S2b, the S2c provides the user plane related control and mobility support between the user equipment (referred to as UE) and the P-GW, and the mobility management protocol supported by it is the Mobile IPv6 Support for Dual Stack Hosts and Routers (referred to as DSMIPv6).

In the EPS system, the Policy and Charging Enforcement Function (referred to as PCEF) entity exists in the P-GW, the Gx interface (see FIG. 1) between the PCRF and the P-GW is used to exchange information. When the interface between the P-GW and the S-GW is based on the PMIPv6, the S-GW also has the bearer binding and event report function (referred to as BBERF) entity to perform the QoS control on the service data, and the Gxc interface between the S-GW and the PCRF is used to exchange information (see FIG. 1). When accessing through the trusty non-3GPP access system, the BBERF also resides in the trusty non-3GPP access gateway. The Gxa interface (see FIG. 1) is used between the Trusty non-3GPP access gateway and the PCRF to exchange information. When the UE is roaming, the S9 interface works as the interface between the host PCRF and the visited PCRF, at the same time, the Application Function (referred to as AF) of the service is provided to the UE, the service information used to make the policy and Charging Control (referred to as PCC) is sent to the PCRF via the Rx interface. In the 3GPP, the access point name (referred to as APN) can be used to find the corresponding PDN. Usually, a connection from the UE to the PDN is known as an IP connectivity access network (referred to as the IP-CAN) session. In the process of establishing an IP-CAN session, the BBERF and the PCEF respectively establish Diameter sessions with the PCRF, the policy charging information and the information used to customize the policy, which are used to control the IP-CAN session, are transmitted through these Diameter sessions.

The corresponding broadband forum (referred to as BBF) proposes the broadband policy control function (referred to as BPCF) entity, as shown in FIG. 2, the main function of the BPCF entity is to make the appropriate policy; the Policy Enforcement Point (referred to as PEF) usually resides in the fixed network transmission equipment, for example the broadband remote access server (BRAS)/broadband network gateway (referred to as BNG), and it works according to the appropriate policy made by the BPCF entity; the AAA stores the user subscription information. The AF makes the policy for the BPCF entity and provides the appropriate service information. Currently, the BPCF entity architecture is still relatively crude, and the relevant details are still in further development.

the scenario of the Fixed Mobile Convergence (referred to as FMC) concerned by the operators is to do the research based on the interoperability of the 3GPP and the BBF. For the scenario of the user accessing the mobile core network through the BBF fixed network, it needs to guarantee the QoS on the entire routing path of the data (the data is transmitted through the fixed and mobile networks). At the current stage, the S9* interface is used (between the PCRF entity and the BPCF entity). In order to better operate the service, the mobile operator expands the wireless coverage, and from the point of view of cost saving, a segment of the WLAN access line from the fixed network operator is rent. The UE accesses through the fixed network WLAN, since the data transmission is through the fixed network, when the mobile operator considers the fixed network operator as an untrusty network, the UE establishes an IP-Sec (IP security) tunnel with the ePDG to ensure that the data transmitted between the UE and the ePDG is encrypted, while the fixed network transmission equipment cannot know the contents of the transmission.

In the process of the UE accessing a mobile network through the fixed network, there might be the situation that the UE accessing the fixed network can not be perceivable by the BBF fixed network, at this time, the BPCF entity is unable to obtain some information necessary for establishing the S9* session, therefore, thus the S9* session cannot be initiated to the PCRF.

SUMMARY OF THE INVENTION

In order to solve the problem that the fixed network BPCF entity cannot initiate an S9* session to the PCRF, the present invention provides a method and system for information transmission.

A method for information transmission, comprising:

an ePDG notifying a PCRF entity of the location information of a UE;

said PCRF entity sending the location information of said UE to the BPCF entity.

Preferably, before the step of the ePDG notifying the PCRF entity of the location information of the UE, the method further comprises:

said UE accessing A mobile core network through a wireless LAN.

Preferably, before the step of said ePDG notifying the PCRF entity of the location information of the UE, the method further comprises:

establishing an IP Security (IP-sec) tunnel between said UE and said ePDG;

said UE initiating an Internet Key Exchange (IKev2) verification to the ePDG.

Preferably, the step of said ePDG notifying the PCRF entity of the location information of the UE is specifically:

said ePDG initiating and establishing a session to said PCRF entity.

Preferably, the aforementioned information transmission method further comprises:

after said PCRF entity receives said location information of the UE, sending response message to said ePDG.

Preferably, said location information comprises the UE identifier and/or tunnel information, said UE identifier comprises the UE's fixed network access identifier, and said tunnel information comprises the UE's local IP address information.

Preferably, said IP address is a public network IP address assigned to the UE by the broadband access server (BRAS)/broadband gateway (BNG), or a public network IP address assigned to a residential gateway (RG) by said BRAS/BNG, or the address of said BRAS/BNG.

Preferably, said UE's local IP address information is the IP address and/or port information used when establishing the IP-Sec tunnel between said UE and said ePDG.

The present invention also provides a system for information transmission, comprising an evolved packet data gateway (ePDG), a policy and charging rules function (PCRF) entity and a broadband policy control function (BPCF) entity; wherein, said ePDG is set to: notify the PCRF of the location information of the UE;

said PCRF entity is set to: send said location information of the UE to said BPCF entity.

Preferably, said ePDG is also set to establish an IP-sec tunnel with said UE.

Preferably, said PCRF entity is also set to, after receiving the location information of the UE, send response message to said ePDG.

Preferably, said location information comprises the UE identifier and/or tunnel information, the UE identifier comprises the UE's fixed network access identifier, and said tunnel information comprises the UE's local IP address information.

Preferably, the UE's local IP address information comprises the IP address and/or port information used when establishing an IP-Sec (IP security) tunnel between said UE and said ePDG.

The present invention provides a method and system for information transmission, wherein, the ePDG notifies the PCRF entity of the location information of the UE, said PCRF sends the location information of the UE to said BPCF entity, and the fixed network side can perceive the access of the UE, thus solving the problem that an S9 * session cannot be initiated to the PCRF entity.

BRIEF DESCRIPTION OF DRAWINGS

The description of the accompanying drawing is used to provide a better understanding of the present invention and forms a part of the specification, and together with the embodiments of the present invention, it is used to explain the present invention and does not constitute a restriction of the present invention. In the accompanying drawings.

PREFERRED EMBODIMENTS OF THE PRESENT INVENTION

Figure 1:
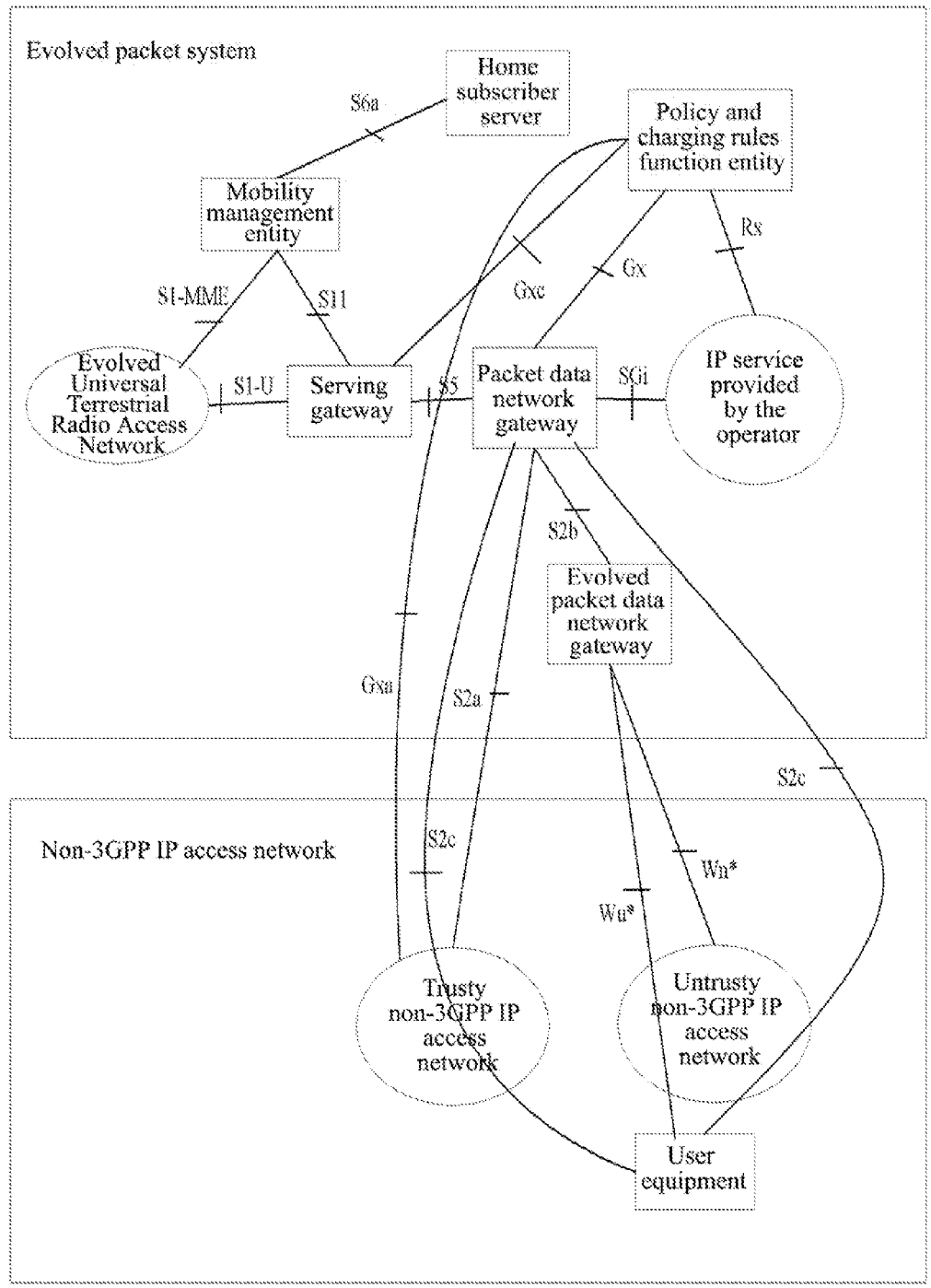
FIG. 1 is a schematic diagram of the EPS system architecture in the related art.
Figure 2:
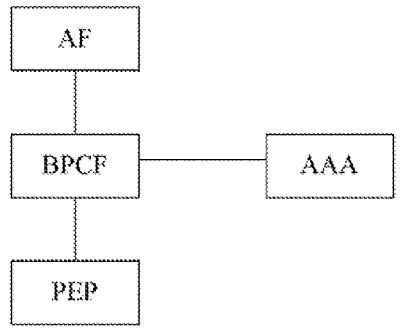
FIG. 2 is a diagram of the BBF network architecture in the related art.
Figure 3:
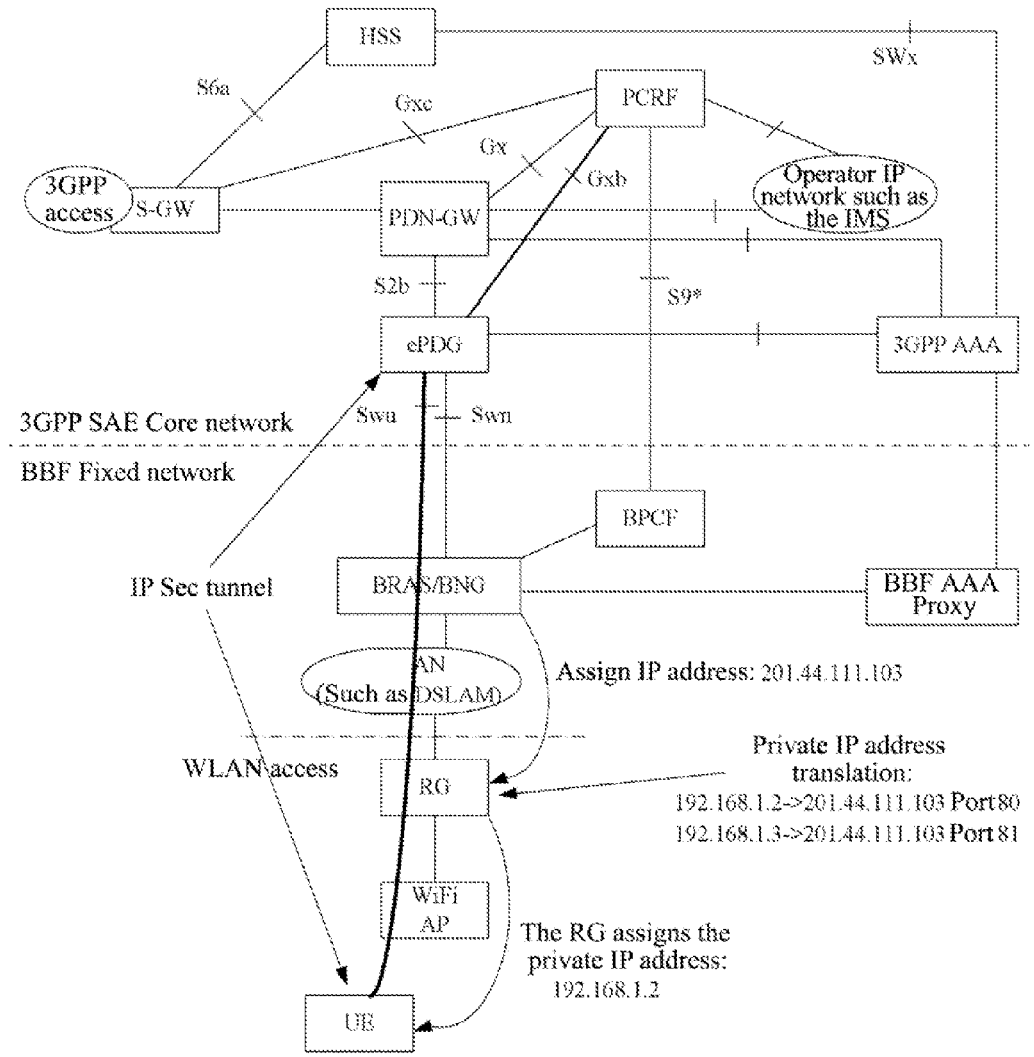
FIG. 3 is a flow chart of a method of the UE accessing the EPS core network via the WLAN.

Due to the difference in the actual deployments, there are the following two access methods for the UE accessing a mobile network through the fixed network:

1, as shown in FIG. 3, the UE accesses a Residential Gateway (referred to as RG) via a WiFi (Wireless Fidelity) access point (referred to as WiFi-AP), accesses the BRA/BNG through the access node (referred to as AN, such as: digital Subscriber Line access Multiplexer, referred to as DSLAM), at this time, the UE's IP address is assigned by the RG (for example: the UE accesses the RG, the method of user name password is used to authenticate on the RG, after the authentication is successful, the RG assigns an internal address to the user), while the RG's IP address is assigned by the BRAS/BNG (for example: when the RG is powered on, the RG initiates an authentication to the BRAS/BNG, and the BRAS/BNG assigns an address to the RG), at this time, the RG needs to perform an IP address translation (a scenario in which the RG performs the NAT).

Figure 4:
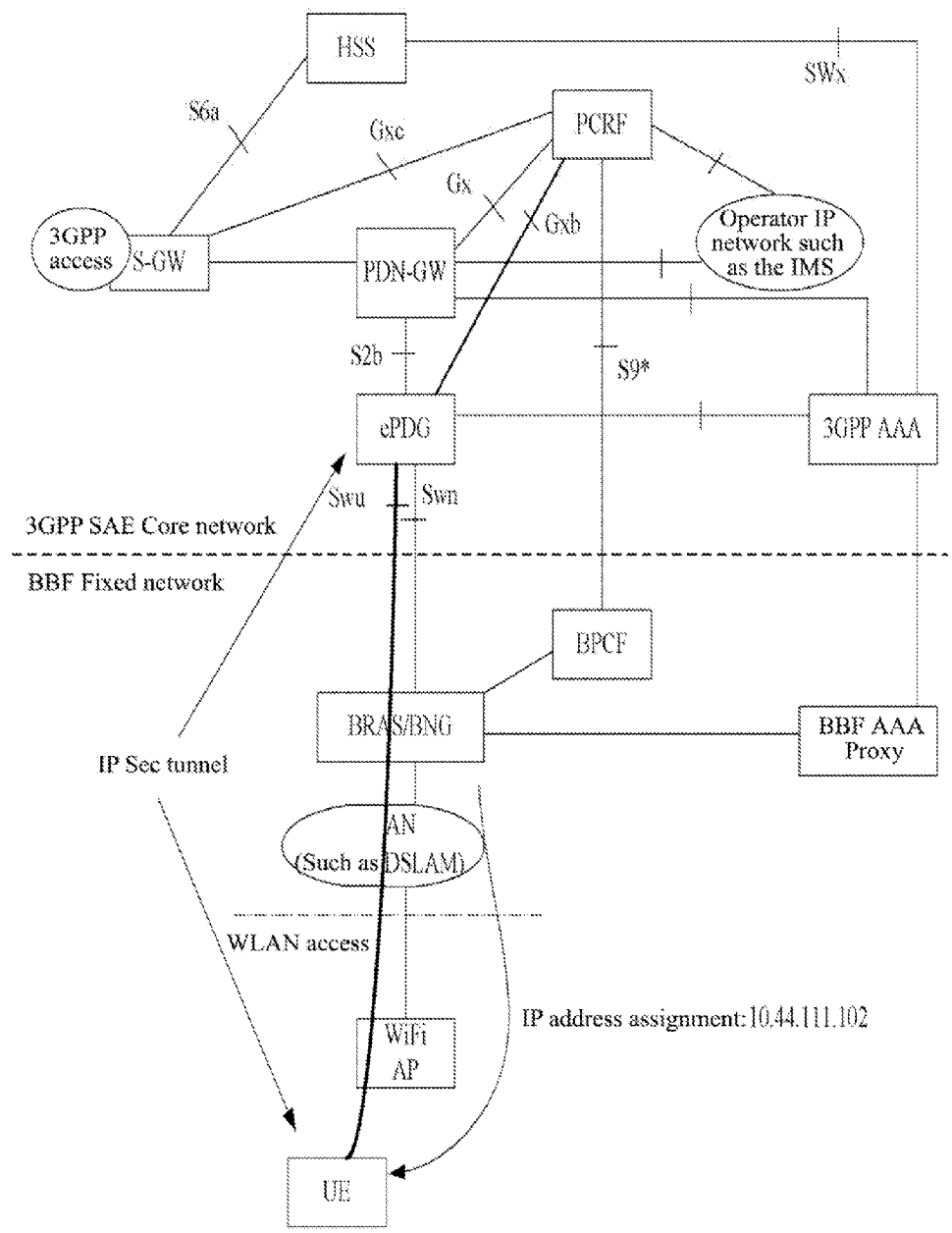
FIG. 4 is a flow chart of another method of the UE accessing the EPS core network via the WLAN.

2, as shown in FIG. 4, the UE accesses through the WiFi AP, and accesses the BRAS/BNG through the AN (of course, there might also exist the RG, but the RG herein is only a two-layer device, and it does not assign an IP address to the user, and the connection between the UE and the BRAS is a two-layer connection), at this time, the UE's IP address is assigned by the BRAS/BNG.

To save the address space, the IP address used by the fixed network operators and assigned by the BRAS/BNG to the UE or the RG might be a private IP address, at this time, the BRAS/BNG also needs to perform the IP address translation (the scenario that the BRAS/BNG performs the NAT).

For the second method, the BBF fixed network can perceive the UE accessing the WLAN, therefore, the BPCF entity can perceive the UE accessing the WLAN (for example: it can perceive through the BNG/BRAS, or the BBF AAA), and the BPCF entity might initiate an S9* session establishment to the PCRF entity.

For the first method, when the UE accesses the WLAN through the RG, since the UE has been authenticated in the RG, the RG assigns an IP address to the UE, the UE will not be authenticated by the BRAS/BNG, therefore, the BBF fixed network cannot perceive the access of the UE (for example: when the UE sends a packet, the RG translates the UE's source IP address in the packet into the RG's own IP address+a certain port, therefore, from the point of view of the BRAS/BNG, the received IP packets are IP packets from the RG, it does not perceive what the specific UE is behind the RG), and an S9* session cannot be initiated to the PCRF entity.

In order to solve the problem that the fixed network cannot initiate an S9* session to the PCRF entity, the embodiment of the present invention provides a method for information transmission.

First, with combination of the accompanying drawings, the first embodiment of the present invention is described.

The embodiment of the present invention provides a method for information transmission, wherein the UE accesses via the fixed network WLAN, after the UE completes the fixed network access authentication and establishes a tunnel to the ePDG (BBERF), the BBERF sends the location information of the UE to the PCRF entity through the Gxb interface, the location information comprises the UE identifier, for example, the UE's fixed network access identifier; said tunnel might be an IP-Sec (IP security) tunnel, and the tunnel information mainly comprises the IP address information when the UE and the ePDG establish an IP-Sec tunnel, the port information (the IP address might be a public network IP address assigned by the BRAS/BNG to the UE, or a public network IP address assigned by the BRAS/BNG to the RG, or the address of the BRAS/BNG), after the PCRF entity receives the message, it establishes an S9* session to the BPCF entity and sends the information to the BPCF entity; wherein, before the step of the ePDG notifying the PCRF entity of the location information of the UE, the UE might also initiate an IKev2 authentication to the ePDG.

Figure 5:
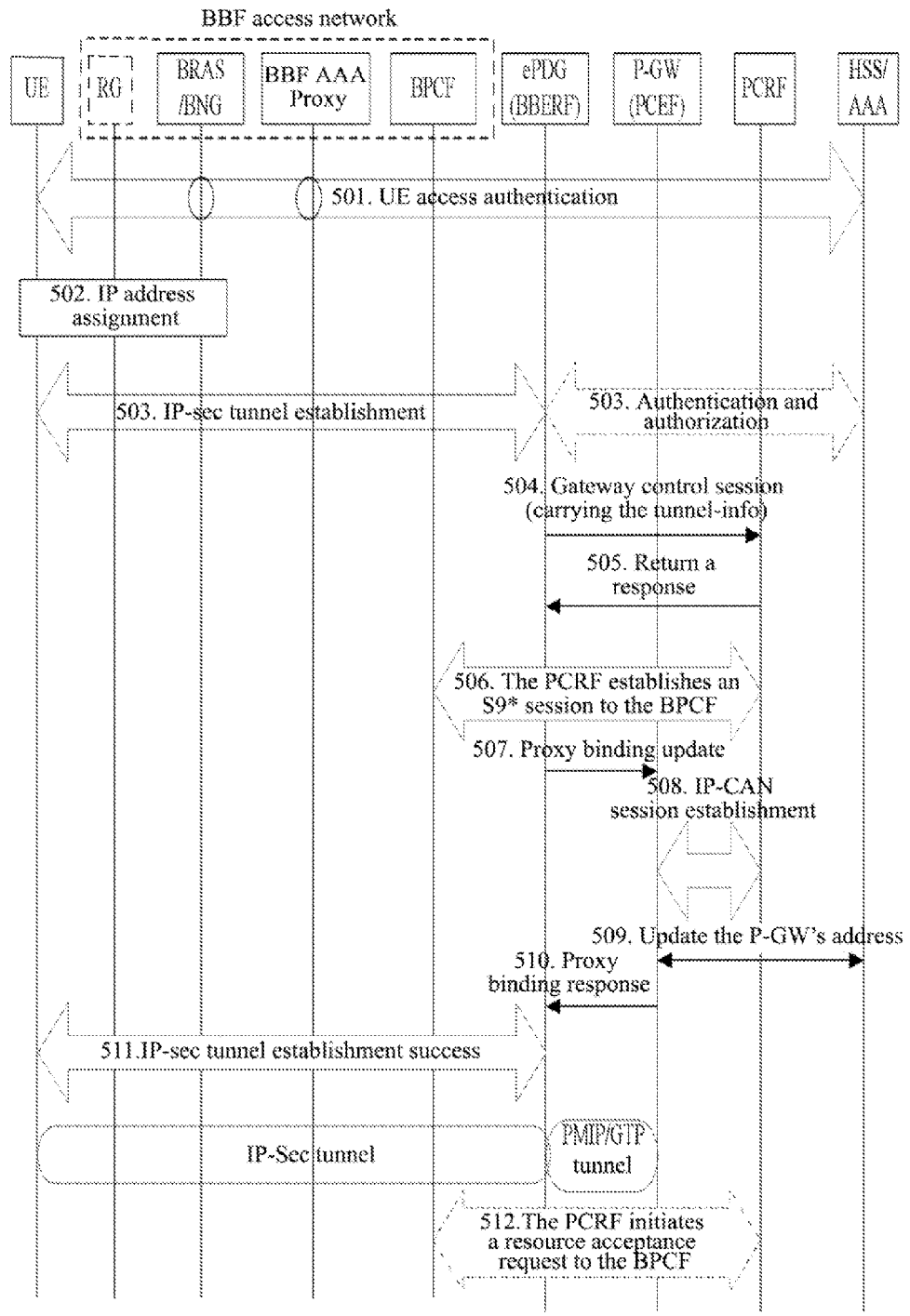
FIG. 5 is a flow chart of a method for information transmission provided in the first embodiment of the present invention.

The specific process is shown in FIG. 5, comprising:

step 501, the UE accesses the mobile core network through the BBF to complete the access authentication, the authentication process might be via the BRAS/BNG, and the BBF AAA Proxy.

Step 502, the BBF access network assigns an IP address to the UE, and it might be the BNG or RG that assigns the IP address to the UE (see Background of the Related Art).

Step 503, an IKev2 authentication and tunnel establishment is initiated to the ePDG, the tunnel might be an IP-Sec tunnel, the ePDG requests the authentication and authorization from the 3GPP AAA, and the 3GPP AAA returns the P-GW's address.

Step 504, the ePDG (BBERF) establishes a session to the PCRF entity, the location information of the UE is carried in the session and sent to the PCRF entity, and the location information comprises the UE identifier, such as, the UE's fixed network access identifier; the tunnel information mainly comprises the IP address and port (the IP address might be a public network IP address assigned by the BRAS/BNG to the UE, or an public network IP address assigned by the BRAS/BNG to the RG, or the address of the BRAS/BNG) when the UE and the ePDG establish a tunnel.

Step 505, the PCRF entity returns a response to the ePDG.

Step 506, the PCRF entity establishes an S9* session to the BPCF entity;

In this step, said PCRF entity receives the location information of the UE, according to the location information, it establishes a session to the BPCF entity. For example, the PCRF entity acquires the UE access information based on the IP address segment, sends an S9* session to the corresponding BPCF entity, and sends session request message. The session request message carries the UE's IP address information.

Step 507, the ePDG sends a proxy binding update to the P-GW.

It should be noted that the step 507 can be performed at the same time of the step 504, or performed after the step 505, and the implementation order is not restricted in the embodiment of the present invention.

Step 508, the PGW initiates an IP-CAN session establishment to the PCRF entity.

Step 509, the PGW updates the IP address to the HSS/AAA.

Step 510, the PGW returns a proxy binding response to the ePDG to complete the PMIP or GTP tunnel establishment between the ePDG and the P-GW.

Step 511, after the ePDG receives the message, it returns IP-Sec tunnel establishment success message to the UE.

step 512, the PCRF entity might initiate a resource acceptance request to the BPCF entity, this step might be performed after the step 508, and performed at the same time of the step 510.

In the following, with combination of the accompanying drawings, the second embodiment of the present invention is described.

In the information transmission method provided in this embodiment of the present invention, the UE accesses via the 3GPP, when a WLAN signal is detected, the UE switches from the 3GPP access to the WLAN access (for example, the user comes back home after work, thus the access is switched from the 3GPP access to the WLAN access at home). When the UE completes the fixed network access authentication and establishes a tunnel to the ePDG (BBERF), the BBERF sends the location information of the UE to the PCRF entity through the Gxb interface, the location information comprises the UE identifier, such as, the UE's fixed network access identifier; said tunnel might be an IP-Sec (IP security) tunnel, and the tunnel information mainly comprises the IP address information and the port information (the IP address might be a public network IP address assigned by the BRAS/BNG to the UE, or a public network IP address assigned by the BRAS/BNG to the RG, or the address of the BRAS/BNG) when the UE and the ePDG establish an IP-Sec tunnel, after the PCRF entity receives the message, it establishes an S9* session to the BPCF entity; wherein, before the step of the ePDG notifying the PCRF entity of the location information of the UE, the UE might also initiate an IKev2 authentication to the ePDG.

Figure 6:
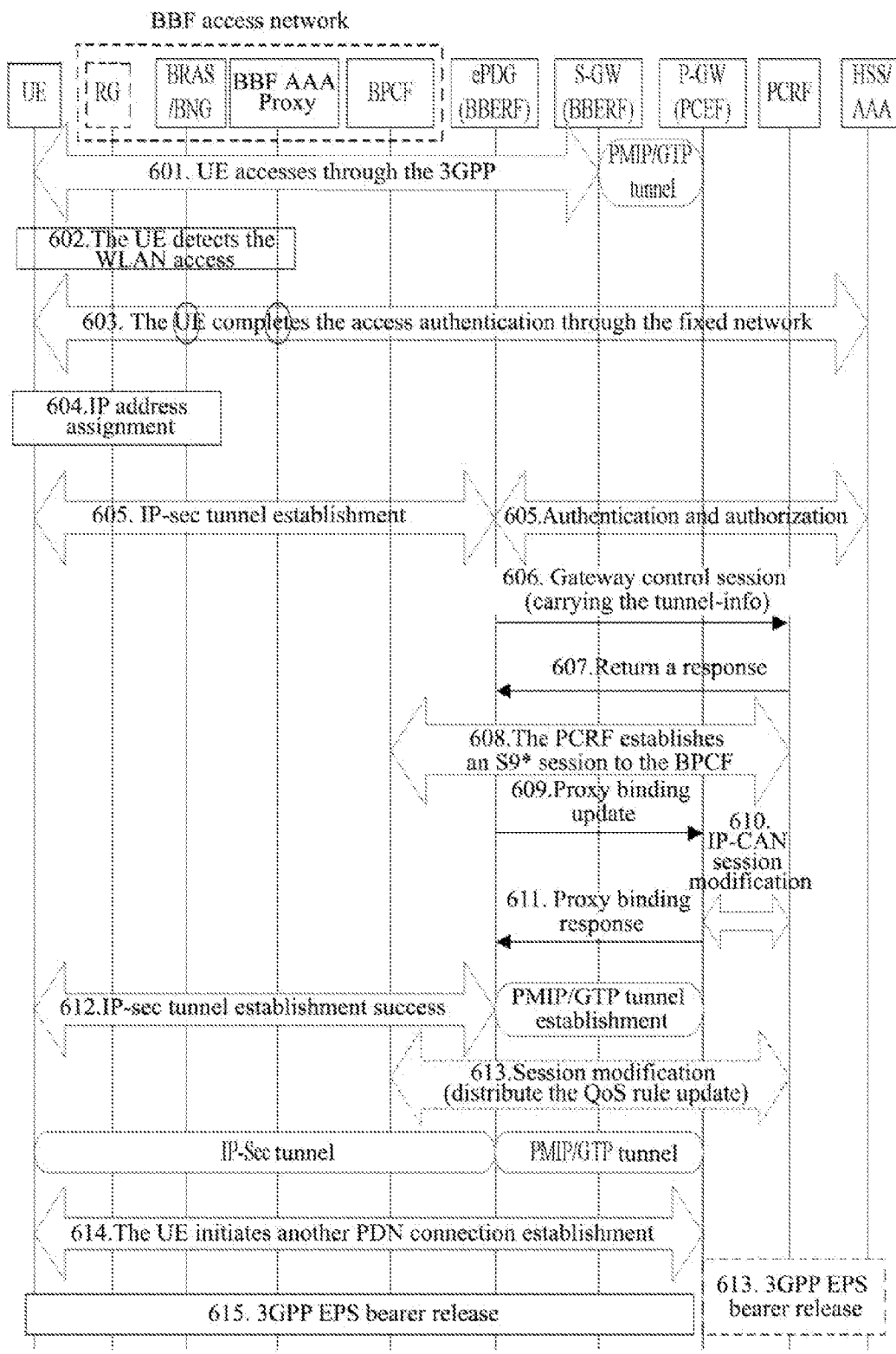
FIG. 6 is a flow chart of a method for information transmission provided in the second embodiment of the present invention.

The specific process is shown in FIG. 6, comprising:

step 601, the UE already accesses through the 3GPP, establishes an EPS bearer, wherein, a PMIP or GTP tunnel is directly established between the S-GW and the P-GW.

Step 602, the UE detects a WLAN signal and tries to access through the WLAN (for example, the user comes back home after work, and accesses through the WLAN at home).

Step 603, the UE accesses the mobile core network through the BBF to complete the access authentication, the authentication process might be via the BRAS/BNG and the BBF AAA Proxy.

Step 604, the BBF access network assigns an IP address to the UE, and it might be the BNG or RG that assigns the IP address to the UE (see Background of the Related Art).

Step 605, the UE initiates an IKev2 authentication and tunnel establishment to the ePDG, the tunnel might be an IP-Sec tunnel, the ePDG requests the authentication and authorization from the 3GPP AAA, and the 3GPP AAA returns the P-GW's address.

Step 606, the ePDG (BBERF) establishes a session to the PCRF entity, the location information of the UE is carried in the session, and the location information comprises the UE identifier, such as, the UE's fixed network access identifier; the tunnel information mainly comprises the UE's local IP address information, and the Local IP address information might be the IP address and port information (the IP address might be a public network IP address assigned by the BRAS/BNG to the UE (a scenario of no-NAT), or an public network IP address assigned by the BRAS/BNG to the RG (a scenario in which the RG works as the NAT), or the address of the BRAS/BNG (a scenario in which the BRAS/BNG works as the NAT)) when the UE and the ePDG establish a tunnel.

step 607, the PCRF entity returns a response to the ePDG;

step 608, the PCRF entity establishes an S9* session to the BPCF entity (for example, the PCRF entity acquires the UE access information based on the IP address segment, and sends an S9* session to the corresponding BPCF entity), and the session carries the IP address information;

Step 609, the ePDG sends a proxy binding update to the P-GW. It should be noted that this step can be performed at the same time of the step 606, or performed after the step 607.

Step 610, the PGW initiates an IP-CAN session modification to the PCRF entity.

step 611, the PGW returns a proxy binding response to the ePDG to complete the PMIP or GTP tunnel establishment between the ePDG and the P-GW.

Step 612, after the ePDG receives the message, it returns IP-Sec tunnel establishment success message to the UE.

step 613, the PCRF entity initiates a resource acceptance request, specifically, it initiates a session modification to the ePDG and distributes QoS rule update. This step might be performed after the step 610, and it is an optional step.

Step 614, the UE initiates another PDN connection establishment, and this step is optional.

Step 615, the P-GW initiates the EPS bearer release of the 3GPP access.

The embodiment of the present invention also provides a system for information transmission, comprising an ePDG, a PCRF entity and a BPCF entity; wherein, said ePDG is set to notify the PCRF of the UE's location information;

said PCRF entity is set to send said UE's location information to said BPCF entity.

Preferably, said ePDG is also set to establish a tunnel with said UE.

Preferably, said tunnel is an IP-sec tunnel.

Preferably, said ePDG is also set to perform an IKev2 authentication with said UE.

Preferably, said PCRF entity is also set to, after receiving the UE's location information, send response message to said ePDG.

Preferably, said location information comprises the UE identifier and/or tunnel information, the UE identifier comprises the UE's fixed network access identifier, and said tunnel information comprises the IP address and/or port information used when the UE and the ePDG establishing a tunnel.

Preferably, the Local IP address information might be the IP address and port information (the IP address might be a public network IP address assigned by the BRAS/BNG to the UE (a scenario of no-NAT), or an public network IP address assigned by the BRAS/BNG to the RG (a scenario in which the RG works as the NAT), or the address of the BRAS/BNG (a scenario in which the BRAS/BNG works as the NAT)).

The embodiment of the present invention provides a method and system for information transmission, wherein after the UE and the ePDG establish a tunnel, said ePDG notifies the PCRF entity of the location information of the UE, said PCRF entity receives the location information of the UE and notifies the location Information to the BPCF entity and establishes a session, specifically an S9* session, with the BPCF entity, the fixed network side can perceive the access of the UE, thus solving the problem that an S9* session cannot be initiated to the PCRF entity.

It should be noted that the information transmission method and system provided in the embodiment of the present invention can also be applicable to the process of the UE accessing the EPS core network through the WiFi AP shown in FIG. 4, to complete the process of the ePDG establishing an S9* session to the PCRF entity. Therefore, the two access processes shown in FIG. 3 and FIG. 4 can use the information transmission method and system provided in the embodiments of the present invention to complete the session establishment, to achieve the unity of the session establishment process, and to simplify requirements for the network design.

The person of ordinary skill in the art can understand that all or part of the steps in the aforementioned embodiment can be completed with a computer program procedure, and the computer program procedure can be stored in a computer readable storage medium and is executed in the corresponding hardware platform (such as a system, device, apparatus, equipment, and so on), during the execution, it comprises one of the steps in the method embodiment, or a combination thereof.

Optionally, all or part of the steps in the aforementioned embodiments can also be achieved with the IC, and these steps can be made into integrated circuit modules, or multiple modules or steps of all the steps can be made into a single integrated circuit module to achieve. Therefore, the present invention is not limited to any particular hardware and software combination.

Each device/functional module/functional unit in the aforementioned embodiments can be achieved with the universal computing device. They can be concentrated in a single computing device, or distributed over a network composed of multiple computing devices.

Each device/functional module/functional unit in the aforementioned embodiments is achieved in the form of a software function module, and is sold or used as a standalone product, and it can be stored in a computer-readable storage medium. The aforementioned computer readable storage medium might be a read-only memory, disk, or CD-ROM.

Industrial Applicability

The present invention provides a method and system for information transmission to solve the problem that the fixed network BPCF cannot initiate an S9* session to the PCRF entity. Through the ePDG notifying the PCRF entity of the UE's location information and said PCRF sending the UE's location information to said BPCF entity, the fixed network side can perceive the access of the UE, thus solving the problem that an S9* session cannot be initiated to the PCRF entity.

What is claimed is:
1. A method for information transmission, comprising:
an evolved packet data gateway (ePDG) notifying a policy and charging rules function (PCRF) entity of location information of a user equipment (UE);
the PCRF entity establishing a S9 session with a broadband policy control function (BPCF) entity;

the PCRF entity sending the location information of the UE to the BPCF entity using the S9 session;

wherein, the location information comprises an identifier and tunnel information of the UE, the UE identifier comprises a fixed network access identifier of the UE, and the tunnel information comprises local IP address information of the UE;

wherein, after the step of the PCRF entity sending the location information of the UE to the BPCF entity using the S9 session, the ePDG entity sends an internet protocol security (IP-Sec) tunnel establishment success message to the user equipment.

2. The information transmission method of claim 1, wherein, before the step of the ePDG notifying the PCRF entity of the location information of the UE, the method further comprises:

the UE accessing a mobile core network through a wireless local area network (WLAN).

3. The information transmission method of claim 1, wherein, before the step of the ePDG notifying the PCRF entity of the location information of the UE, the method further comprises:

establishing a tunnel between the UE and the ePDG.

4. The information transmission method of claim 1, wherein, the step of the ePDG notifying the PCRF entity of the location information of the UE comprises:

the ePDG initiating and establishing a session to the PCRF entity.

5. The information transmission method of claim 1, further comprises:

after the PCRF entity receives the location information of the UE, sending response message to the ePDG.

6. The information transmission method of claim 1, wherein, the local IP address information of the UE is an IP address and/or port information used when establishing the tunnel between the UE and the ePDG.

7. The information transmission method of claim 6, wherein, the IP address is a public network IP address assigned to the UE by a broadband access server (BRAS) / broadband gateway (BNG), or a public network IP address assigned to a residential gateway (RG) by the BRAS/BNG, or an address of the BRAS/BNG.

8. The information transmission method of claim 7, wherein, the tunnel is an IP-Sec tunnel.

9. A system for information transmission, comprising an evolved packet data gateway (ePDG) comprising one or more non-transitory computer readable mediums or one or more integrated circuits, a policy and charging rules function (PCRF) entity comprising one or more non-transitory computer readable mediums or one or more integrated circuits and a broadband policy control function (BPCF) entity comprising one or more non-transitory computer readable mediums or one or more integrated circuits; wherein, the ePDG is set to notify the PCRF of location information of a user equipment (UE);

the PCRF entity is set to establish a S9 session with the BPCF entity and send the location information of the UE to the BPCF entity using the S9 session;

wherein, the location information comprises an identifier and tunnel information of the UE, the UE identifier comprises a fixed network access identifier of the UE, and the tunnel information comprises local IP address information of the UE;

wherein, after the PCRF entity sends the location information of the UE to the BPCF entity using the S9 session, the ePDG entity sends an internet protocol security (IP-Sec) tunnel establishment success to the UE.

10. The information transmission system of claim 9, wherein, the ePDG is further set to establish a tunnel with the UE.

11. The information transmission system of claim 9, wherein, the PCRF entity is further set to send response message to the ePDG after receiving the location information of the UE.

12. The information transmission system of claim 9, wherein, the local IP address information of the UE comprises an IP address and/or port information used when establishing an IP-Sec (IP security) tunnel between the UE and the ePDG.

13. The information transmission system of claim 12, wherein, the IP address is a public network IP address assigned to the UE by a broadband access server (BRAS) / broadband gateway (BNG), or a public network IP address assigned to a residential gateway (RG) by the BRAS/BNG, or an address of the BRAS/BNG.

14. The information transmission system of claim 13, wherein, the tunnel is an IP-Sec tunnel.

15. A policy and charging rules function (PCRF) entity, comprising:

an information receiving unit, comprising one or more non-transitory computer readable mediums or one or more integrated circuits, configured to receive location information of a user equipment (UE) sent by an evolved packet data gateway (ePDG);

an information sending unit, comprising one or more non-transitory computer readable mediums or one or more integrated circuits, configured to establish a S9 session with a broadband policy control function (BPCF) entity and to send the location information received by the information receiving unit to the BPCF entity using the S9 session;

wherein, the location information comprises an identifier and tunnel information of the UE, the UE identifier comprises a fixed network access identifier of the UE, and the tunnel information comprises local IP address information of the UE;

wherein, after the information sending unit is used to send the location information to a broadband policy control function (BPCF) entity, the information sending unit is further configured to send an internet protocol security (IP-Sec) tunnel establishment success to the UE.

* * * * *